United States Patent [19]
Kamon et al.

[11] Patent Number: 6,041,146
[45] Date of Patent: *Mar. 21, 2000

[54] IMAGE READING APPARATUS FOR READING BOOK-LIKE DOCUMENTS

[75] Inventors: Koichi Kamon, Takatsuki; Shinya Matsuda, Kyoto, both of Japan

[73] Assignee: Minolta Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/599,380

[22] Filed: Feb. 9, 1996

[30] Foreign Application Priority Data

Feb. 14, 1995 [JP] Japan ................................. 7-050467

[51] Int. Cl.⁷ ...................................... G06K 9/40
[52] U.S. Cl. .............................. 382/274; 355/25; 355/82; 399/362
[58] Field of Search .................................. 382/274, 312, 382/106, 275, 286, 318, 323; 358/474, 461, 493, 449, 475, 488; 355/25, 82; 399/362, 52; 345/432

[56] References Cited

U.S. PATENT DOCUMENTS

| | | | |
|---|---|---|---|
| 4,111,550 | 9/1978 | Ohishi | 355/75 |
| 5,084,611 | 1/1992 | Okisu et al. | 250/208.1 |
| 5,101,284 | 3/1992 | Tanabe | 358/461 |
| 5,107,350 | 4/1992 | Omori | 358/461 |
| 5,377,019 | 12/1994 | Okisu et al. | 358/464 |
| 5,386,299 | 1/1995 | Wilson et al. | 358/406 |
| 5,402,249 | 3/1995 | Koseki et al. | 358/446 |
| 5,416,609 | 5/1995 | Matsuda et al. | 358/474 |
| 5,579,129 | 11/1996 | Iwata et al. | 358/474 |
| 5,585,926 | 12/1996 | Fujii et al. | 358/474 |
| 5,610,720 | 3/1997 | Fujioka et al. | 358/474 |

*Primary Examiner*—Amelia Au
*Assistant Examiner*—Timothy M. Johnson
*Attorney, Agent, or Firm*—Sidley & Austin

[57] ABSTRACT

An image reader for reading book-like documents placed on a document platen in a face upward condition, said image reader comprises a shading reference panel provided beside the document platen which is white in color and of uniform density, an image reading device which reads the document platen on which the book-like document is placed and the shading reference panel, and outputs image data, a height detector which detects a height distribution of the book-like document, an illuminance detector which detects an illuminance irregularity in accordance with the image data corresponding to the shading reference panel, calculator which calculates shading correction data in accordance with the height distribution and the illuminance irregularity on the shading reference panel and, shading corrector which corrects the illuminance irregularity of the image data corresponding to the book-like document in accordance with the shading correction data.

22 Claims, 7 Drawing Sheets

IMAGE READING APPARATUS FOR READING BOOK-LIKE DOCUMENTS

BACKGROUND OF THE INVENTION

1. Field of the Invention

The present invention relates to an image reading apparatus for reading thick documents such as books and the like, and specifically relates to an image data correction method used in reading in a subscanning direction.

2. Description of the Related Art

Conventional apparatuses for reading documents require that documents such as books and the like are placed facing upward on a document platen and are read by a reading unit disposed above the document platen. In this type of apparatus, noise generated by illumination from external fluorescent lights and the like external to the apparatus is introduced between the document and the reading unit. The aforesaid noise produced illumination irregularities in the subscan direction occur because in general fluorescent lights and the like flash on and off at a commercial frequencies and their illuminance fluctuates over time. A shading reference panel is provided for correcting illuminance irregularities in the subscan direction, so as to measure the illuminance of said shading reference panel by a sensor and correct the read document data in accordance with the detection results (subscan shading correction).

For example, Japanese Unexamined Patent Application No. HEI 4-345271 discloses a method for shading correction wherein the read document data are corrected based on the read data of a shading reference panel of each one line in a subscan direction.

In conventional apparatus, however, the shading reference panel is flat, whereas a book-like document has a curved surface and, therefore, there are differences in the nature of the illuminance irregularities between the document surface and the shading reference panel which cause inadequate correction because luminance correction is accomplished only by the read data of the shading reference panel.

An object of the present invention is to eliminate the previously described disadvantages by providing an image forming apparatus capable of correcting illuminance irregularities in a subscan direction even when there is fluctuation of the elevation difference of the document surface and shading reference panel and the illumination irregularities of the two do not match.

SUMMARY OF THE INVENTION

A first object of the present invention is to correct illuminance irregularities in a subscan direction which are generated when a book-like document having height is illuminated.

Another object of the present invention is to determine a correction coefficient for correcting illuminance irregularities in a subscan direction which are generated when a book-like document having height is illuminated, said correction coefficient being determined from the read data of a shading reference panel and document height data.

Still another object of the present invention is to determine a correction coefficient from read data of a shading reference panel wherein the height of the shading reference panel deformes in accordance with changes in the document height for the purpose of correcting illuminance irregularities in a subscan direction which are generated when a book-like document having height is illuminated.

These and other objects, advantages and features of the invention will become apparent from the following description thereof taken in conjunction with the accompanying drawings which illustrate specific embodiments of the invention.

BRIEF DESCRIPTION OF THE DRAWINGS

FIG. 9 is a section view of the lifting mechanism of the reference panel of the image forming apparatus viewed from the from;

In the following description, like parts are designated by like reference numbers throughout the several drawings.

DESCRIPTION OF THE PREFERRED EMBODIMENTS

Figure 1:
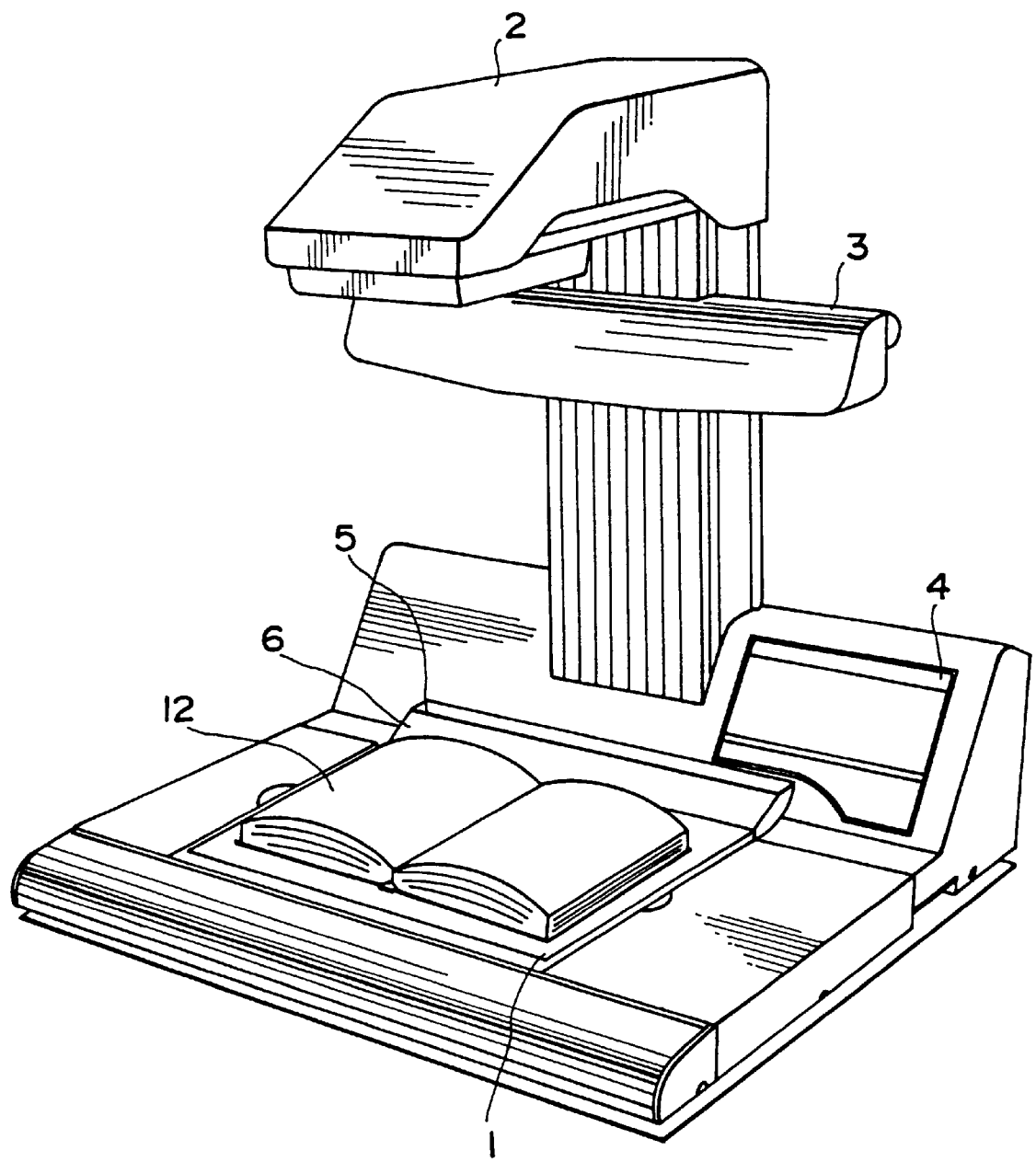
FIG. 1 is an exterior view of an embodiment of the image reading apparatus of the present invention.

Embodiments of the image forming apparatus of the present invention are described hereafter with reference to the accompanying drawings. FIG. 1 shows the overall construction of an image forming apparatus with a book-like document (hereinafter referred to as "book document 12") disposed on document platen 1. A book document 12 such as a book, file or the like is placed facing upward on document platen 1, and an image sensing device 2 having a line sensor for reading the open face surface of book document 12 is provided above document platen 1. Image sensing device 12 is provided with a mirror 6 for reflecting the document head surface, and a shading reference panel 5 (hereinafter referred to as "reference panel 5") which is white in color and of uniform density used for subscan shading correction and arranged on the interior side of document platen 1 at the edge of the reading range. Provided above and on the interior side of document platen 1 are an illumination unit 3 for illuminating a book document 12 on document platen 1, operation panel 4 on the interior side of document platen 1 for setting image conditions and the like, and a control section (not illustrated) for controlling the prescan operation and main scan operation of the book document 12 image sensing unit 2. Illumination unit 3 uses a halogen lamp, and is turned on by an AC power source (not shown in the drawing), so as to not generate illuminance irregularities of specific periodicity as does fluorescent lights. A predetermined spacing is maintained between document platen 1 and image sensing unit 2, and the space therebetween is a working space.

Figure 2:
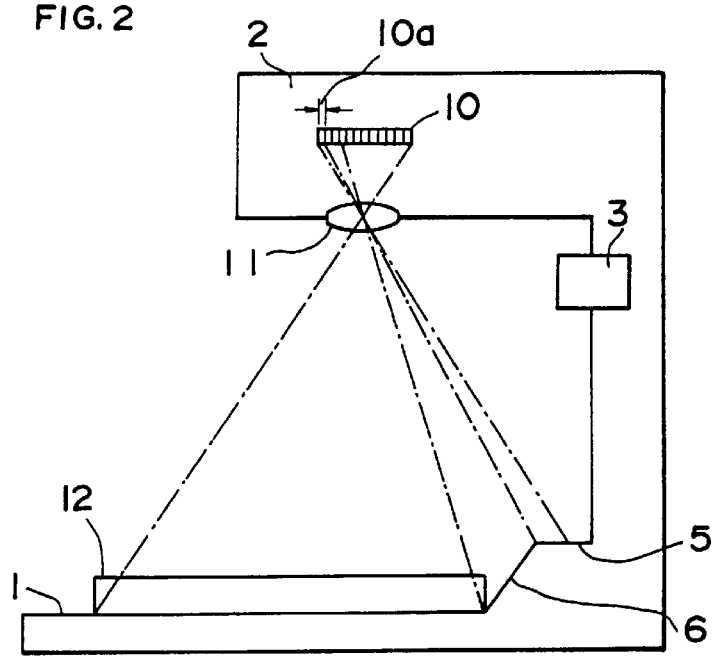
FIG. 2 is a brief section view of the image reading apparatus viewed from the side.
Figure 3:
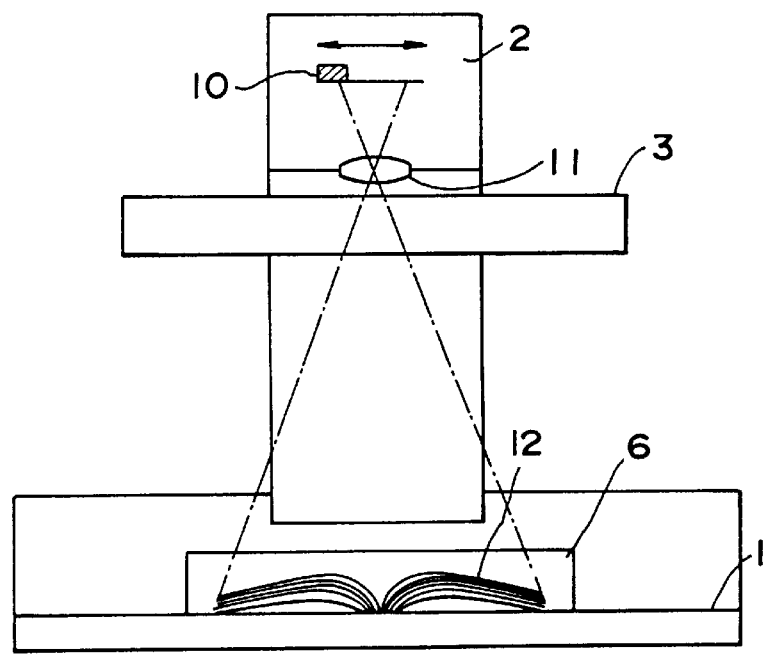
FIG. 3 briefly shows the construction of the image reading apparatus viewed from the front.

FIGS. 2 and 3 briefly show the construction of the image forming apparatus viewed from the side and front, respectively. Image sensing unit 2 comprises a lens 11 and CCD line sensor 10 arranged at a position for forming a document image via said lens 11 which optically scans (arrow direction in FIG. 3) and reads book document 12. Part 10a of CCD line sensor 1 is the part that reads reference panel 5 for subscan shading correction.

Figure 4:
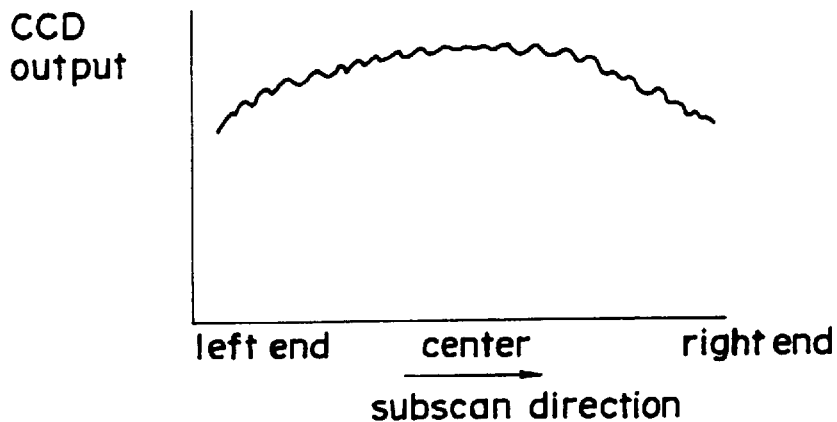
FIG. 4 is an illustration shown the change in CCD line sensor output data in the subscan direction when the shading reference panel is read.

FIG. 4 shows the output data of part 10a of CCD line sensor 10 when reference panel 5 is read for subscan shading correction. The horizontal axis indicates the position in the subscan direction, and the vertical axis indicates the output value of part 10a of CCD line sensor 10. The output value increases near the center of the subscan direction and decreases at the bilateral edges, and this variation arises from irregularities of lens 11 resulting from the cosine fourth law. The slight fluctuation of the output is the influence of exterior fluorescent light and the like turned on by an AC power source not shown in the drawings, and are caused by fluctuation of the fluorescent light illuminance at predetermined frequencies. These fluctuations appear in the image data as illuminance irregularities in the subscan direction, and, therefore, correction is required.

The correction method is similar to typical main scan shading correction inasmuch as the output value of part 10a of CCD line sensor 10 is corrected to a constant value, as shown in the graph of FIG. 4. Specifically, part 10a of CCD line sensor 10, which reads reference panel 5 for each subscan line during reading, outputs a one line output value that is multiplied by a coefficient so as to become a constant value relative to each output value of that line. This relationship can rendered by the following expression.

$$DOUT = (k/Ds) \times DIN \quad (1)$$

Ds: Output value of part 10a of CCD sensor 10 at the reference line

DIN: Output value of part 10a before shading correction at the object line to be corrected DOUT: Output value of part 10a after shading correction at the object line to be corrected k: Correction constant (reference line output data are corrected to the constant output value k)

The aforesaid expression applies when there is no change in the elevation difference between the document surface and the surface of reference panel 5, but when the document surface is curved as in the case of book-like documents and the like, the elevation difference changes between the reference panel surface and the document surface of book document 12. In this case, the output value when reference panel 5 is read does not correspond to illuminance irregularity on the document surface, such that subscan shading correction is performed only on the output value when reference panel 5 is read.

The reason for the aforesaid difference and the solution method are described below with reference to FIGS. 5 and 6.

Figure 5:
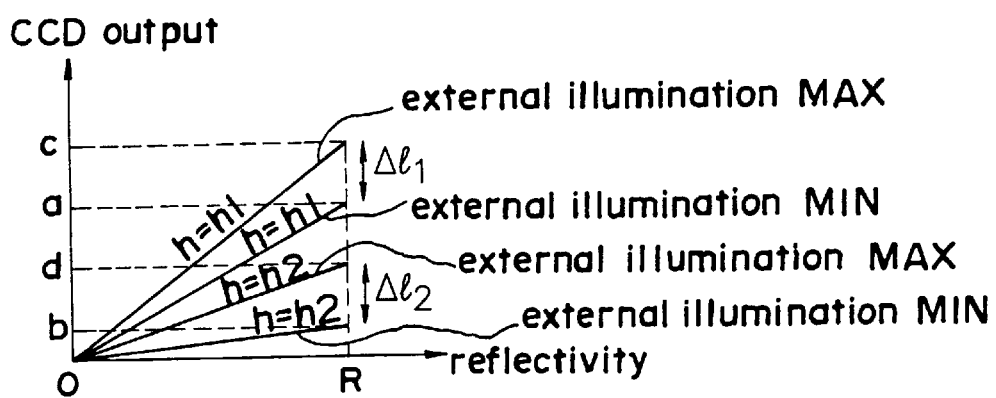
FIG. 5 is an illustration showing the CCD line sensor output data relative to reflectivity at the respective heights of the document surface and reference panel surface when external illumination is turned on at predetermined frequencies.
Figure 6:
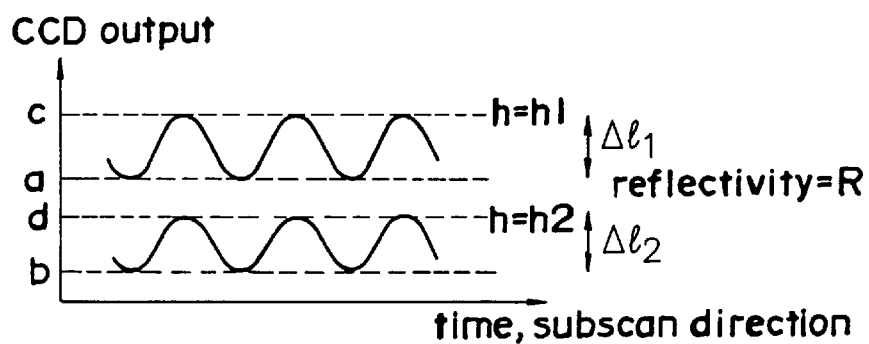
FIG. 6 is an illustration showing the change in the subscan direction and the time of the CCD line sensor output data at the respective heights on the document surface and reference panel surface when external illumination is turned on at predetermined frequencies.

FIGS. 5 and 6 show the output of part 10a of CCD line sensor 10 corresponding to book document 12 and reference panel 5 when only external lighting of fluorescent lights are turned on at predetermined frequency.

Illumination unit 3 is turned on when reading is actually accomplished. The following discussion concerns a method of correcting illuminance irregularities by provisional estimation of illuminance under fluorescent lighting along which causes illuminance irregularity.

FIG. 5 is a graph showing the relationship between the output of the CCD line sensor 10 (vertical axis) and the reflectivities of the reference panel 5 and book document 12 (horizontal axis). The reflectivities of the reference panel 5 and book document 12 are both represented by R on the horizontal axis. The height of reference panel 5 and the height of book document 12 at a specific position are different, and are respectively designated "h1" and "h2". In the drawing, "a" and "c" are output values of CCD line sensor 10 of reference panel 5 at reflectivity "R". Whereas "a" is the output value when exterior illuminance is at a minimum, "c" is the output value when exterior illuminance is at a maximum. Also in the drawing, "d" and "b" are output values of CCD line sensor 10 of book document 12 at specific positions at reflectivity "R". Whereas "b" is the output value when exterior illuminance is at a minimum, "d" is the output value when exterior illuminance is at a maximum. The difference in CCD output values "(a–b)" due to the difference in heights of the book document 12 and reference panel 5 as shown in FIG. 6 is sufficiently greater than the difference in the amount of change in CCD output induced by the influence of illuminance fluctuation of external illumination ($\Delta^I_1$, $\Delta^I_2$).

The output value corresponding to reference panel 5 is designated "Ds" in equation (1), and when said output value "Ds" is corrected to output value "c" when exterior illuminance is at a maximum in FIGS. 5 and 6, the constant "k" of equation (1) is the value "c". Thus, if the output value "Ds" of reference panel 5 is value "a" when the coefficient "(k/Ds)" for multiplying the pre-correction output value "DIN" in equation (1) is designated "α", said coefficient "α" is a value such that "α=c/a". On the other hand, when the pre-correction output value "DIN" corresponding to the surface of book document 12 is designated "b" and is corrected to output value "d" when exterior illuminance is at a maximum, the estimated coefficient "β" at this time is a value such that "β=d/b", but coefficient "β" and coefficient "α" are different values because the different heights of book document 12 and reference panel 5.

Accordingly, on the line at which output value "Ds" corresponding to reference panel 5 becomes value "a", even though the coefficient "α," is multiplied to correct the output value "b" corresponding to the surface of book document 12 at a different height than reference panel 5, the corrected output value "d" is not obtained such that subscan shading correction is inadequate.

In this case, if coefficient "β" is derived from "d/b=β" and used for correction rather than coefficient "α" obtained from the output value corresponding to reference panel 5, it is possible to supplement the insufficient correction of subscan shading. Since the relationship is similar to the relationship of $\Delta^I_1$ and $\Delta^I_2$, the following expression is obtained.

The ratio of the values "a" and "b" corresponding to the respective heights of reference panel 5 and book document 12 can be stated as follows:

$$(\alpha-1) \times a \approx (\beta-1) \times b \quad (2)$$

document 12. The ratio of equation (2) can also be determined by a function of height "h2" of book document 12, i.e., Z(h2), because the height "h1" of reference panel 5 does not change.

$$b/a = (\alpha-1)/(\beta-1) = Z(h2) \quad (3)$$

Wherein $Z(h2)>1.0$ when $b>a$, i.e., when $h2>h1$, and $Z(h2)<1.0$ when $b<a$, i.e., when $h2<h1$.

From equation (3), when the output value corresponding to reference panel 5 is "a", and when the height of the surface of book document 12 is h2, the correction coefficient "β" corresponding to the document can be obtained from the following expression.

$$\beta = 1 = (\alpha-1)/Z(h2), \text{ or}$$

$$\beta = 1 + (\alpha-1)/Z(h2) \qquad (4)$$

Accordingly, correction can be accomplished even when there is fluctuation in the elevation difference of the reference panel 5 and the surface of book document 12 according to equation (5) below.

$$DOUT = \{1+(\alpha-1)/Z(h2)\} \times DIN \qquad (5)$$

Wherein $\alpha = k/Ds$.

Figure 7:
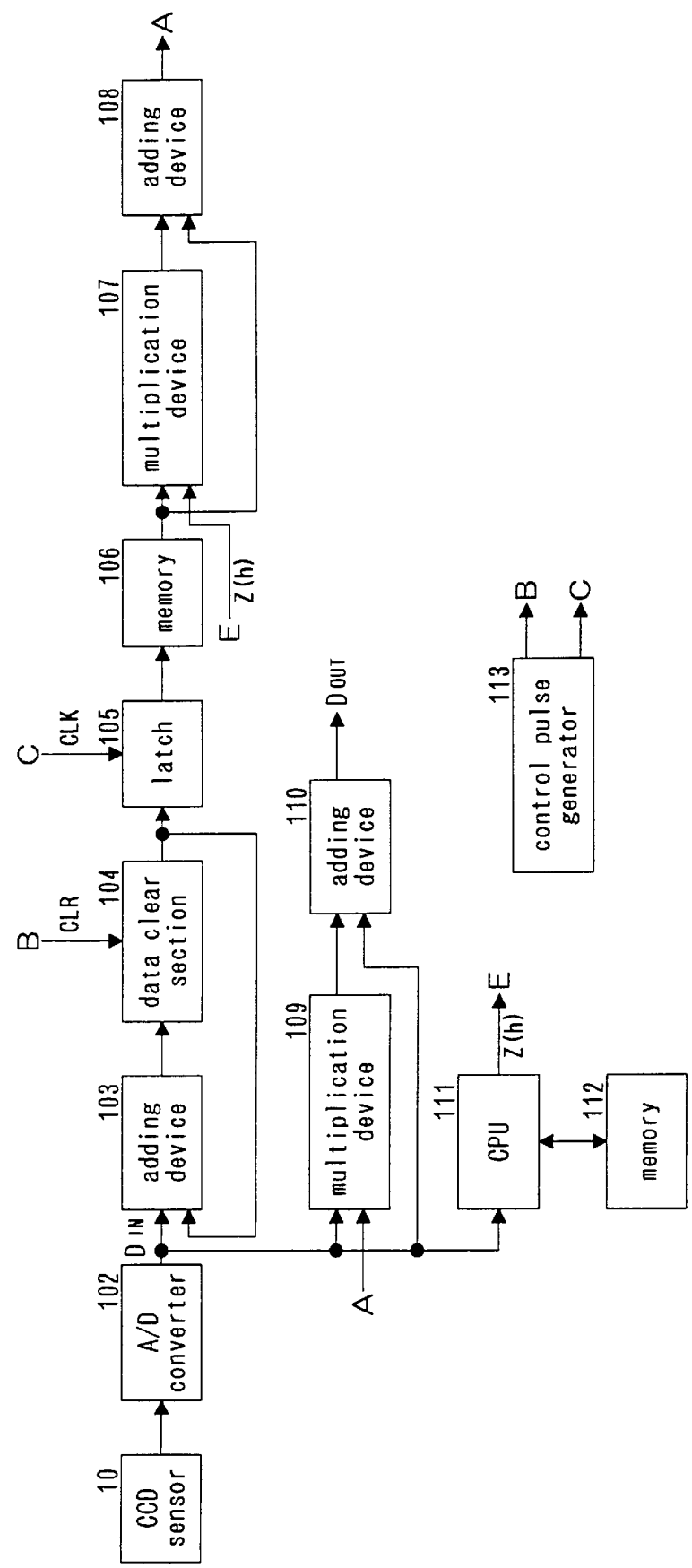
FIG. 7 is a block diagram of the circuits of the control section of the image reading apparatus.

Specific examples of the correction process using the aforesaid equation (5) are described below with reference to FIG. 7. FIG. 7 shows a block diagram of the circuit of the control section within the image reading apparatus. The said control section comprises various circuits including CPU 111 which processes signals input from CCD line sensor 10. CPU 111 is provided with a coefficient generating means for subscan shading correction, and a correction means for correcting read data using said coefficient.

The initial setting method is described below. Document platen 1 of the image reading apparatus of FIG. 1 is shielded from exterior illumination, so that the only light impinging document platen 1 is light from DC light source 3. In this state, a document is placed on document platen 1, and CCD line sensor 10 is moved in the subscan direction to read the document. Output from CCD line sensor 10 is subjected to analog-to-digital (A/D) conversion by an A/D converter 102, and the output of CCD line sensor 10 for each line is averaged by CPU 111, and the averaged data for each line is stored in memory 112. The document height is set at various values and this process is repeated. Using the averaged data for various document heights of each line obtained by the aforesaid process and the data at the height of reference panel 5, the function "Z(h2)" of height "h2" of the surface of book document 12 is calculated and stored in memory 112.

The document reading operation is described below with reference to FIGS. 1, 3, and 7. A book document 12 is placed on document platen 1, and a read start switch (not illustrated) is turned ON. CCD line sensor 10 performs a subscan (prescan) in the arrow (1) direction shown in FIG. 3. At this time, the head surface shape of book document 12 is reflected in mirror 6 and read by CCD line sensor 10 within image sensing unit 2. The read picture element data are subjected to A/D conversion by the A/D converter 102, and input to CPU 111. CPU 111 converts the number of picture elements corresponding to the head surface of book document 12 reflected in mirror 6 to the height "h2" of book document 12. This process is executed for each subscan line to detect the height "h2" of book document 12 for each line, and is stored in memory 112. When the detection of the height of book document 12 is completed, CCD line sensor 10 is moved in the arrow (2) direction and the image of book document 12 is read (main scan).

In the main scan, the height "h2" of book document 12 obtained in the aforesaid prescan process and the function "Z(h2)" of book document 12 height "h2" set initially are used for the subscan shading correction process. This process is described below, considering the input of image data of one particular line in FIG. 7 from CCD line sensor 10 via A/D converter 102. Image data "DIN" are sequentially arrayed data corresponding to reference panel 5, data corresponding to mirror 6, and data corresponding to document platen 1 (refer to FIG. 2). Image data "DIN" are input to adding device 103 one pixel at a time, and the input one pixel data are again input to adding device 103 via a data carrier, then added to the one pixel data input from the A/D converter. At the same time, the output from adding device 103 is input to data carrier 103, and data other than data corresponding to reference panel 5 are cleared. Therefore, only data corresponding to reference panel 5 are cumulatively added by adding device 103. When the number of added data attains the number of data corresponding to reference panel 5, the output of adding device 103 is latched by latch 105. The latched output is input to memory 106, and converted to a coefficient. This converted coefficient is the previously described $(\alpha-1)$ in equation (5). The coefficient $(\alpha-1)$ output from memory 106 is multiplied via multiplication device 107 by the coefficient "1/Z(h2)-1" determined from the function "Z(h2)" of book document 12 height "h2" stored in memory 112, then added via adding device 108 to the coefficient "$(\alpha-1)$" output from memory 106. The result is the value "$(\alpha-1)/Z(h2)$" of equation (5), which becomes the subscan shading correction coefficient for that line.

This subscan shading correction coefficient and the input data "DIN" are multiplied by multiplication device 109, and the resulting value is again added via adding device 110 to "DIN", to accomplish the calculation of equation (5) and obtain the corrected output data "DOUT". In FIG. 7, control pulse generator 113 outputs control pulses to various parts of the circuit.

According to the image reading apparatus of the previously described embodiment, shading correction can be accurately accomplished even when the height of the document surface changes in the subscan direction because shading correction is accomplished in accordance with the height of book document 12 of each line based on the data read from reference panel 5.

Figure 8:
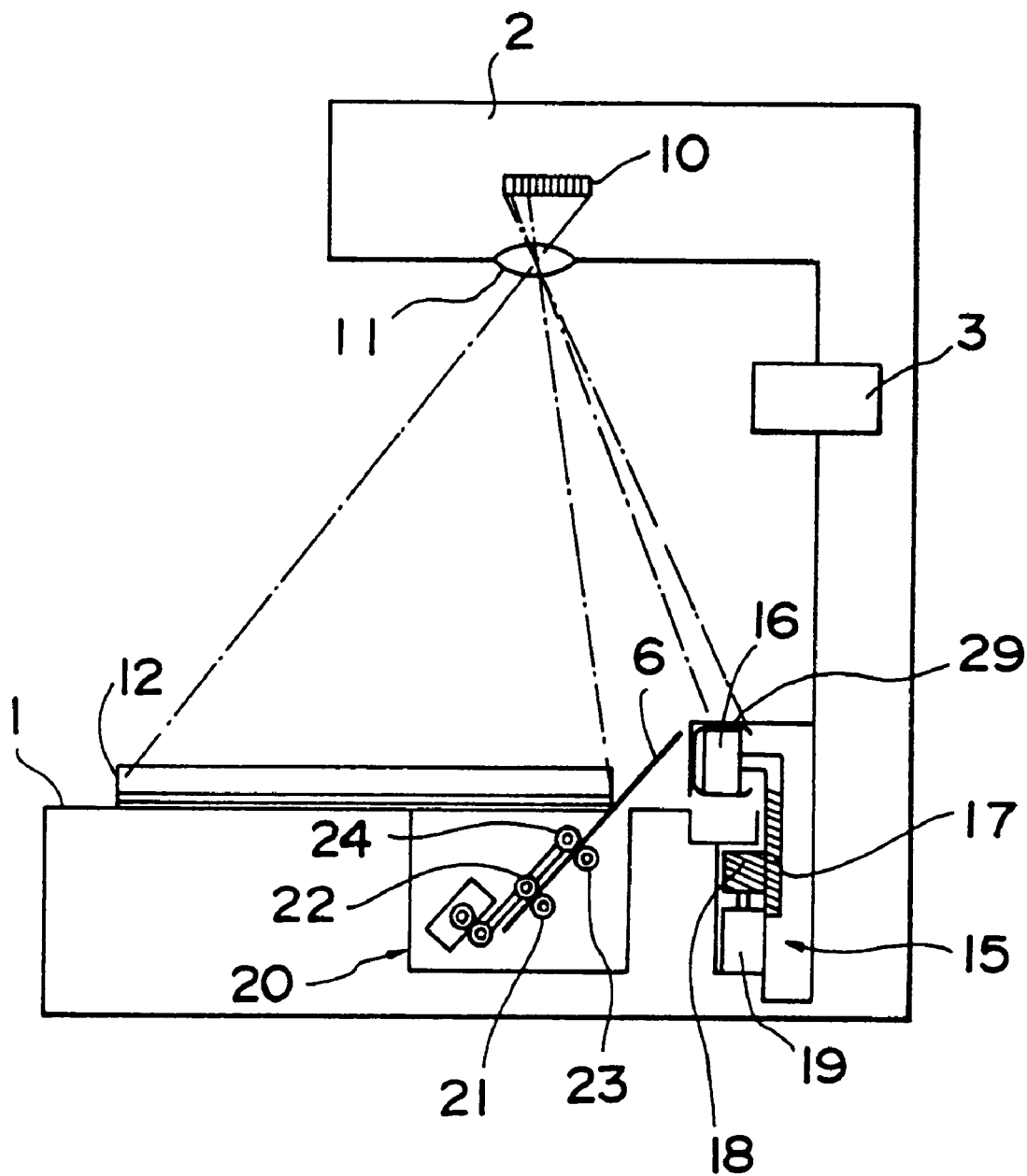
FIG. 8 is a brief section view of another embodiment of the image reading apparatus viewed from the side.

Another embodiment of the present invention is described below with reference to FIG. 8. This embodiment accomplishes accurate subscan shading correction by detecting changes in the height of a book document 12 when there is a change in the elevation difference between reference panel 29 and book document 12, and changing the height of reference panel 29 in accordance with the change in height of book document 12 based on the aforesaid height change detection data. FIG. 8 briefly shows the construction of the image reading apparatus viewed from the side; like parts in common with FIG. 2 are labeled by like reference numbers. The exterior view of the image reading apparatus is identical to that of FIG. 1 and further description is therefore omitted. Reference panel 29 in the present embodiment is constructed so as to allow lifting of the reference panel surface, and mirror 6 is retractably movable relative to document platen 1. Reference panel 29 is formed of a flexible sheet material such as rubber or the like, and is provided on the interior side with a lifting mechanism 15 for lifting reference panel 29. Lifting mechanism 15 comprises a plurality of individual lifting rollers 16 provided at suitable spacing in the subscan direction and in contact with the flexible sheet, screw 17 for holding lifting roller 16, screw 18 connected to screw 17, and motor 19 for rotating screw 18. Motor 19 is controlled by the control section. The mechanism 10 for moving mirror 6 comprises rollers 21–24. The reason for retractably moving mirror 6 relative to document platen 1 is to avoid influencing reference panel 29 by mirror 6 when reference panel 29 is read.

Figure 9:
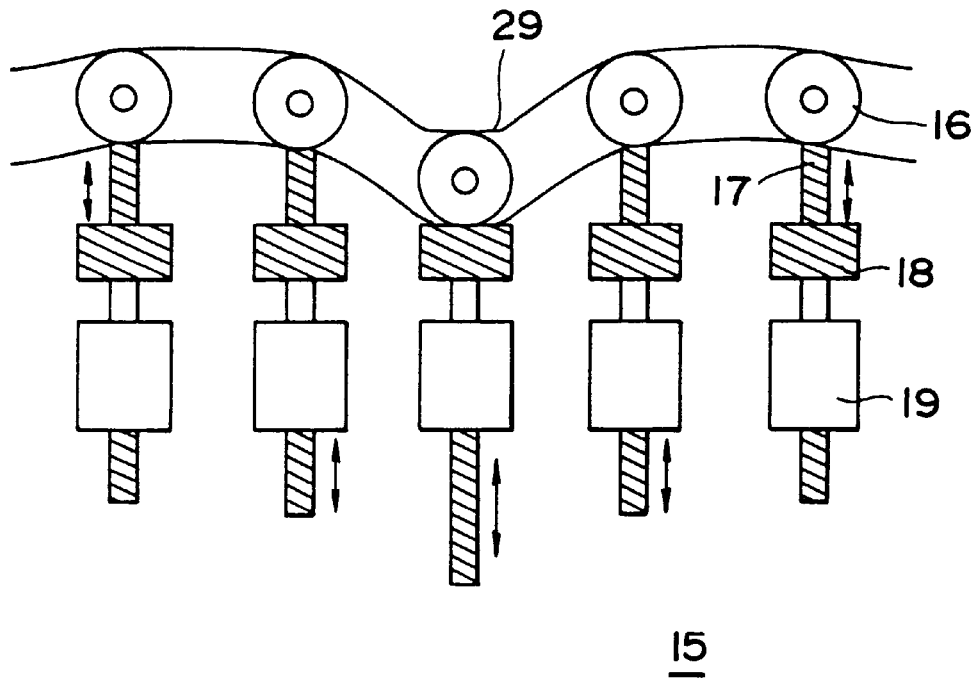

FIG. 9 is a section view showing the lifting mechanism 15 for lifting reference panel 29 as viewed from the front. Reference panel control section 214 controls motor 19 so as to lift the surface of reference panel 29 by lifting rollers 16 via screws 17 and 18 based on the height data calculated by CPU 211 of the control section of FIG. 11 described later. The surface of reference panel 29 is formed along the surface of book document 12 via lifting mechanism 15.

Figure 10:
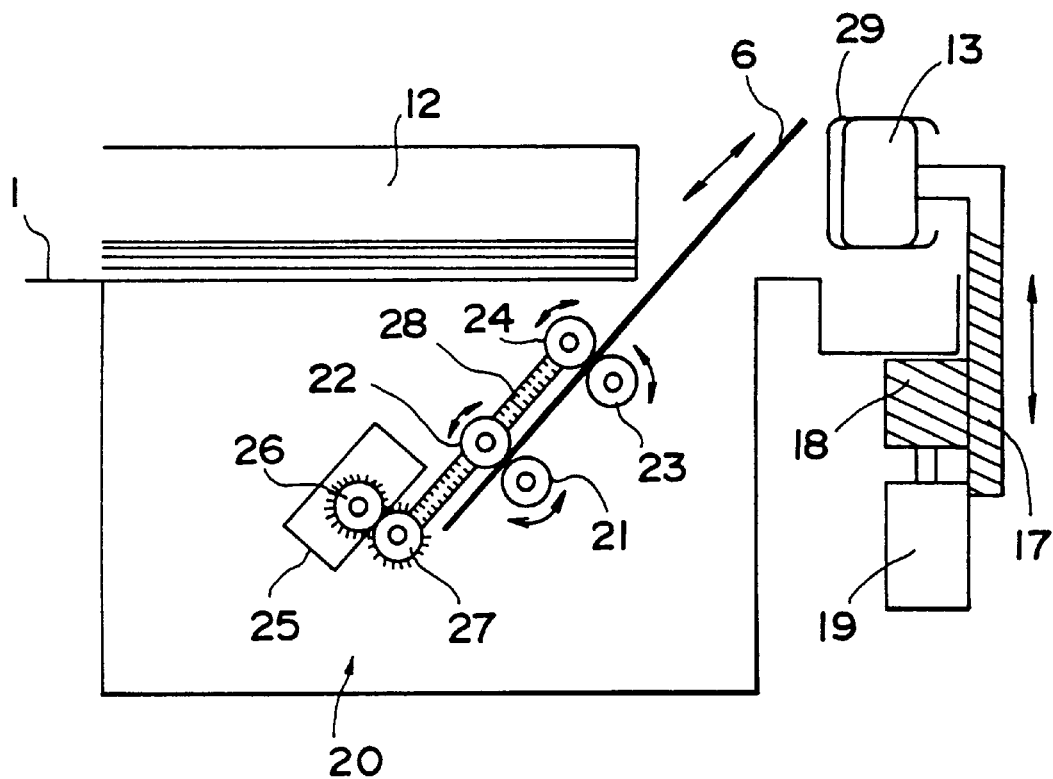
FIG. 10 is a section view of the mirror advancing mechanism and lifting mechanism of the reference panel of the image forming apparatus viewed from the side.

FIG. 10 is a section view of retracting mechanism 20 housed within document platen 1 for retracting mirror 6 as viewed from the side. Retracting mechanism 20 comprises in addition to rollers 21–24 for holding and moving mirror 6, a motor 25 as an actuation source, gears 26 and 27 as a transmission mechanism, and belt 28. When the document height detection for each line is completed by the processing via CPU 211, mirror 6 is moved by the rotation of rollers 22 and 24 via belt 28 and the rotation of gears 26 and 27 driven by motor 25 which is actuated by the mirror control section 215, such that mirror 6 is housed within document platen 1. This retraction is accomplished to prevent the shadow of mirror 6 from falling on reference panel 29 when reference panel 29 is being read.

CCD line sensor 10 accomplishes subscanning when the read start switch is ON, the height of book document 12 is detected for each line via CPU 112 via the image in mirror 6, and when height detection is completed, mirror 6 is housed in document platen 1; thereafter, reference panel 29 is set in a shape corresponding to the change in height of book document 12. When the prescan is completed, CCD line sensor 10 subscans in the opposite direction to accomplish reading of data of reference panel 29, data of book document 12, and correction of subscan shading for each line.

Figure 11:
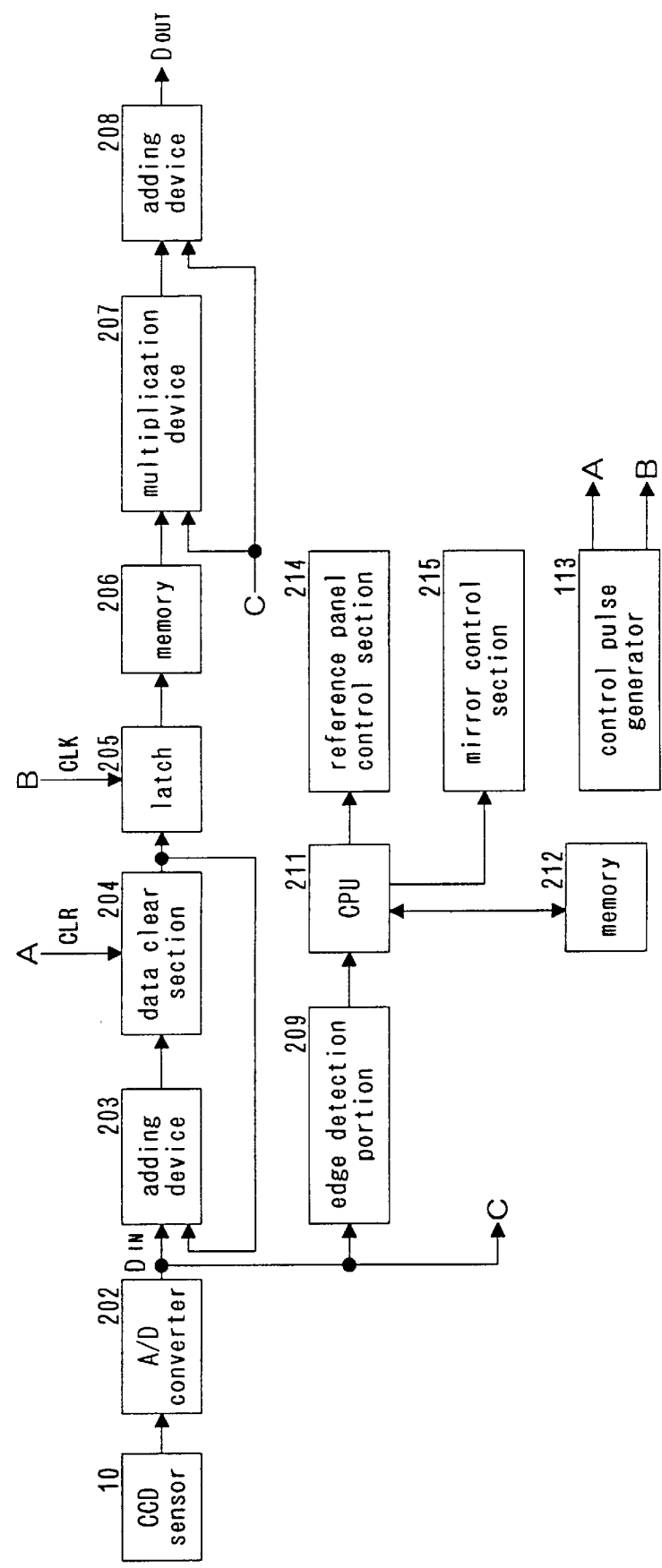
FIG. 11 is a block diagram of the control circuit of the image forming apparatus.

FIG. 11 shows a circuit block diagram of the control section for signal processing in the image reading apparatus. In the prescan operation, image data signals of mirror 6 obtained by CCD line sensor 10 are input to edge detection portion 209 via A/D converter 202, and subjected to edge detection. CPU 211 calculates the height of book document 12 of each line based on the aforesaid edge detection. These height data values are stored in memory 212. The height data for each line stored in memory 212 are input to the reference panel control section 214 via CPU 211. When height detection is completed and the prescan ends, a signal is transmitted from CPU 211 to mirror control section 215 to retract mirror 6. In the main scan, when one line of image data are output by CCD line sensor 10, the said image data includes a sequential array of data for reference panel 29, and data for book document 12. Image data "DIN" is input one pixel at a time to adding device 203, and the input one pixel data are input again to adding device 203 via data carrier 204, then added to the one pixel data input from A/D converter 202. At the same time, the output from adding device 203 is input to data carrier 104 and data other than data corresponding to reference panel 29 is cleared. Accordingly, only data corresponding to reference panel 29 are cumulatively added by adding device 203. When the number of added data attains the number of data corresponding to reference panel 29, the output of adding device 203 is latched by latch 205. The latched output is input to memory 206 and converted to a coefficient. This converted coefficient is the shading correction coefficient. Multiplication device 207 multiplies the coefficient from memory 206 and the image data "DIN", and the result is again added to the image data by adding device 208, whereupon the correction calculations end. A calculation of the correction coefficient has been shown in equation (1), but is expressed by the expression below in the present embodiment.

In equation (1), k/Ds=1+k' (k': constant)

$$DOUT = (1 + k') \times DIN$$
$$= k' \times DIN + DIN$$

The image reading apparatus of the previously described embodiment lifts reference panel 29 in accordance with the detected height of book document 12, and generates a correction coefficient for correcting subscan shading based on the read data of reference panel 29 moved to the height of book document 12, and accurately corrects the read document data using the aforesaid coefficient.

The image reading apparatus of the present invention as described above corrects read data within each read line in accordance with the height of book document 12 of each line based on the read data of a reference panel used for subscan shading correction of each line in a subscan direction, such that luminance irregularities can be suitably corrected in the subscan direction in accordance with the type of document even when a difference in illuminance arises due to elevation differences between the document surface and the surface of the reference panel used for subscan shading correction, thereby making possible image reading regardless of the thickness of the document.

Although the present invention has been fully described by way of examples with reference to the accompanying drawings, it is to be noted that various changes and modifications will be apparent to those skilled in the art.

Therefore, unless otherwise such changes and modifications depart from the scope of the present invention, they should be construed as being included therein.

What is claimed is:

1. An image reader for reading a book document placed on a document platen in a face upward condition, said image reader comprising:

a shading reference panel provided beside the document platen, an image reading device for reading the book document and the shading reference panel, and for outputting image data, first detecting means for detecting a height distribution of the book document, said height distribution comprising a plurality of vertical height measurements of a document surface above the platen and substantially distributed across said document surface, second detecting means for detecting an illuminance irregularity in accordance with the image data corresponding to the shading reference panel, calculating means for calculating shading correction data based on analysis of both the detected height distribution across said document surface and the illuminance irregularity corresponding to the shading reference panel, and shading correction means for correcting an illuminance irregularity of the image data corresponding to the book document in accordance with the shading correction data.

2. An image reader according to claim 1, wherein said image reader has a mirror which reflects a head side surface of the document to the image reading device, and said first detecting means detects said height distribution in accordance with the image data outputted by said image reading device.

3. An image reader according to claim 1, wherein said image reading device is a line sensor, and wherein the line sensor moves in a subscan direction to read the book document and the shading reference panel.

4. An image reader according to claim 1, wherein said illuminance irregularities depend on fluctuation of an external fluorescent light illuminance at predetermined frequencies.

5. An image reader for reading a book document in accordance with claim 1, wherein said shading correction data comprises a plurality of shading correction data values, each of said shading correction data values corrsponding to one of said plurality of detected vertical height measurements in said height distribution.

6. An image reader for reading a book document placed on a document platen in a face upward condition, said image reader comprising:

a shading reference panel provided beside the document platen, an image reading device for reading the book document and said shading reference panel, and for outputting image data, first detecting means for detecting a height distribution of the book document, said height distribution comprising a plurality of vertical height measurements of a document surface above the platen and substantially distributed across said document surface, control means for controlling a condition of said shading reference panel based on analysis of the detected height distribution across said document surface, second detecting means for detecting, subsequent to said controlling of a condition of said shading reference panel, an illuminance irregularity in accordance with the image data corresponding to the shading reference panel and for generating a shading correction data, and shading correction means for correcting an illuminance irregularity of the image data corresponding to the book document in accordance with the shading correction data.

7. An image reader according to claim 6, wherein said image reader has a mirror which reflects a head side surface of the document to the image reading device, and said first detecting means detects said height distribution in accordance with the image data outputted by said image reading device.

8. An image reader according to claim 6, wherein said image reading device is a line sensor, and wherein the line sensor moves in a subscan direction to read the book document and said shading reference panel.

9. A image reader in accordance with claim 8, wherein said line sensor reads a plurality of lines of image data to read the book document, each line of image data including data from said shading reference panel and data from said book document.

10. An image reader according to claim 6, wherein said illuminance irregularities depend on fluctuation of an external fluorescent light illuminance at predetermined frequencies.

11. An image reader according to claim 6, wherein said shading reference panel is readily flexible so as to be conformable to various document height distribution contours.

12. An image reader according to claim 11, wherein said control means for controlling a condition of said shading reference panel controls a contour of said shading reference panel.

13. An image reader according to claim 12, further comprising a deforming device responsive to said control means, wherein said deforming device deforms the contour of said shading reference panel to a shape corresponding to the height distribution of the book document.

14. An image reader according to claim 13, wherein said deforming device includes a plurality of vertical moving mechanisms provided at suitable spacing along the shading reference panel and being adapted for vertical movement, each of said mechanisms being in contact with the shading reference panel so that a vertical movement of the mechanism deforms the shading reference panel.

15. An image reader for reading a book document in accordance with claim 6, wherein said shading correction data comprises a plurality of shading correction data values, each of said shading correction data values corresponding to one of said plurality of detected vertical height measurements in said height distribution.

16. A method of processing an image of a book document placed on a document platen in a face upward condition, the method comprising the steps of:

reading a shading reference panel provided beside the document platen and outputting image data, detecting an illuminance irregularity in accordance with the image data corresponding to the shading reference panel.

detecting a height distribution of the book document, said height distribution comprising a plurality of vertical height measurements of a document surface above the platen and substantially distributed across said document surface, calulating shading correction data based on analysis of both the detected height distribution across said document surface and the illuminance irregularity corresponding to the shading reference panel, reading the book document to output image data, and correcting an illuminance irregularity of the image data corresponding to the book document in accordance with the shading correction data.

17. A method of processing an image of a book document in accordance with claim 16, wherein said shading correction data comprises a plurality of shading correction data values, each of said shading correction data values corresponding to one of said plurality of detected vertical height measurements in said height distribution.

18. A method of processing an image of a book document placed on a document platens in a face upward condition, the method comprising the steps of:

detecting a height distribution of the book document, said height distribution comprising a plurality of vertical height measurements of a document surface above the platen.

providing a shading reference panel having a deformable height contour, deforming said height contour of said shading reference panel based on analysis of the detected height distribution of the book document.

reading image data from said shading reference panel and the book document, detecting an illuminance irregularity in accordance with the image data corresponding to the shading reference panel for generating a shading correction data, correcting an illuminance irregularity of the image data corresponding to the book document in accordance with the shading correction data, and outputting the image data corresponding to the book document corrected by said correcting step.

19. An image reader for reading a book document placed on a document platen in a face upward condition, said image reader comprising:

a shading reference panel provided beside the document platen, an image reading device for reading the book document and the shading reference panel, and for outputting image data, said image reading device reading a plurality of lines of image data, each of said read plurality of lines of image data including data from at least a portion of said shading reference panel and data from at least a portion of said book document, first detecting means for detecting a height distribution of the book document, said height distribution comprising a plurality of vertical height measurements of a document surface above the platen and substantially distributed across said document surface, second detecting means for detecting an illuminance irregularity in accordance with the image data corresponding to the shading reference panel, calculating means for calculating shading correction data based on analysis of both the detected height distribution across said document surface and the illuminance irregularity corresponding to the shading reference panel, and shading correction means for correcting an illuminance irregularity of the image data corresponding to the book document in accordance with the shading correction data.

20. An image reader for reading a book document in accordance with claim 19, further comprising:

a control means for controlling said shading reference panel based on said detected height distribution, and a deforming device responsive to said control means, wherein said shading reference panel is readily flexible so as to be conformable to various document height distributions and wherein said deforming device deforms a vertical height contour of said shading reference panel to a shape corresponding to the detected height distribution of the book document.

21. An image reader for reading a book document placed on a document platen in a face upward condition, said image reader comprising:

a shading reference panel provided beside the document platen, an image reading device for reading the book document and the shading reference panel, and for outputting image data, first detecting means for detecting a height distribution of the book document, said height distribution comprising a plurality of vertical height measurements of a document surface above the platen, second detecting means for detecting an illuminance irregularity in accordance with the image data corresponding to the shading reference panel, calculating means for calculating shading correction data based on analysis of an elevation difference between the shading reference panel and the document surface and the illuminance irregularity corresponding to the shading reference panel, and shading correction means for correcting an illuminance irregularity of the image data corresponding to the book document in accordance with the shading correction data.

22. A method of processing an image of a book document placed on a document platen in a face upward condition, the method comprising the steps of:

reading a shading reference panel provided beside the document platen and outputting image data, detecting an illuminance irregularity in accordance with the image data corresponding to the shading reference panel, detecting a height distribution of the book document, said height distribution comprising a plurality of vertical height measurements of a document surface above the platen, calculating shading correction data based on analysis of an elevation difference between the shading reference panel and the document surface and the illuminance irregularity corresponding to the shading reference panel, reading the book document to output image data, and correcting an illuminance irregularity of the image data corresponding to the book document in accordance with the shading correction data.

* * * * *